May 13, 1941.  A. J. BERG ET AL  2,241,387
SPRING AND METHOD OF MAKING THE SAME
Original Filed Dec. 8, 1937
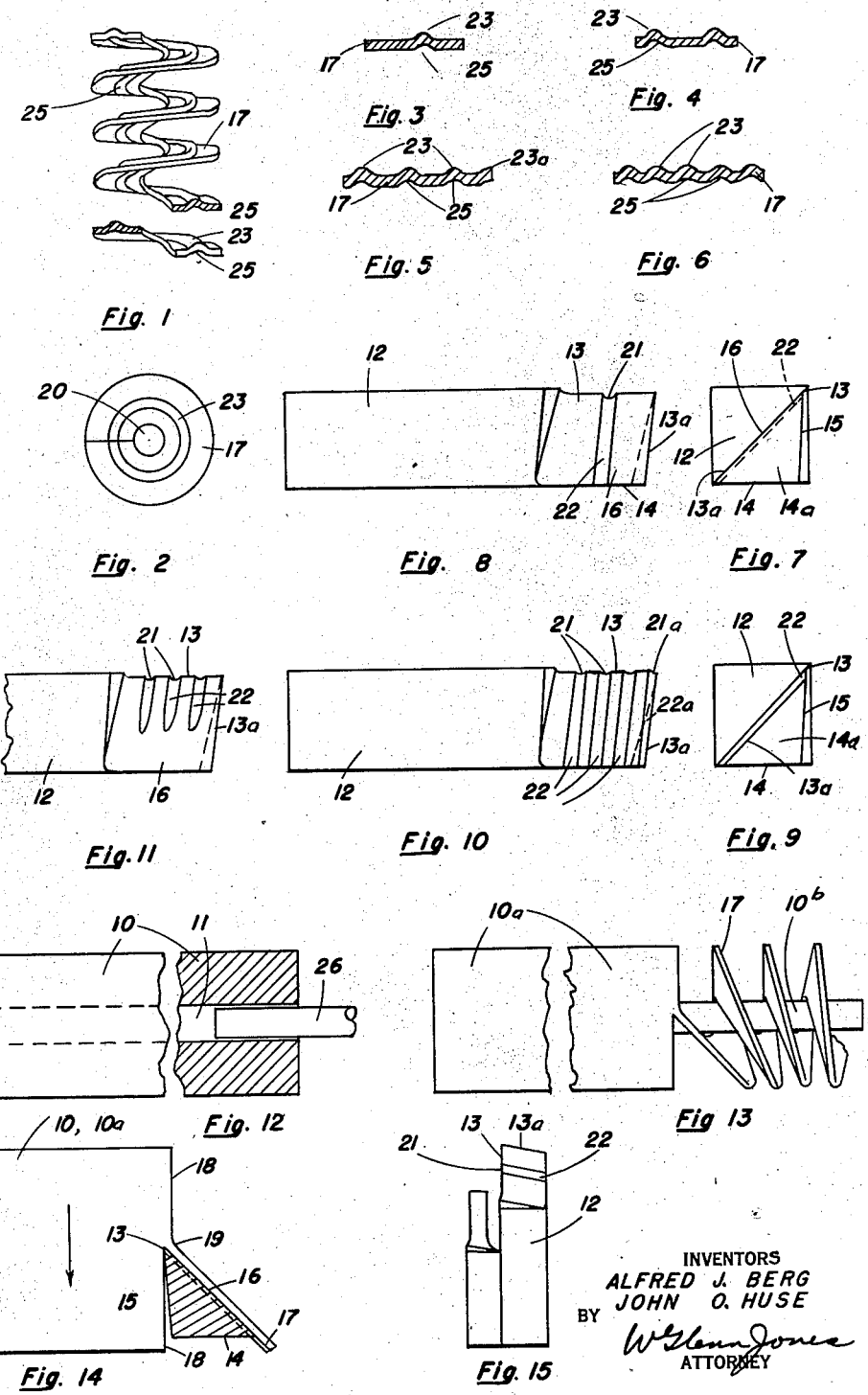
INVENTORS
ALFRED J. BERG
JOHN O. HUSE
BY W. Glenn Jones
ATTORNEY Patented May 13, 1941

2,241,387

UNITED STATES PATENT OFFICE 2,241,387

SPRING AND METHOD OF MAKING THE SAME

Alfred J. Berg, Portsmouth, N. H., and John O. Huse, United States Navy

Original application December 8, 1937, Serial No. 178,698. Divided and this application December 15, 1939, Serial No. 309,419

5 Claims. (Cl. 267—1)

(Granted under the act of March 3, 1883, as amended April 30, 1928; 370 O. G. 757)

Our invention relates primarily to a new and useful spring and method of making the same.

In the prior art, springs have been made from round or angular shaped wire or flat, straight strips of metal, which have been helically coiled about a mandrel which has been revolvably mounted in a lathe or similar machine tool to rotate about the longitudinal axis of the mandrel with the initial end of the wire or strip secured in the machine. The wire or strip is held, for instance, in the tool post of the lathe where the wire or strip is subjected to considerable longitudinal stress as it is wound about the mandrel by the operation of the lathe or tool. The pitch of the spring is afforded by the rate of longitudinal motion of the tool post relative to the rate at which the lathe or tool rotates the wire or strip about the mandrel. The holding of the strip by the tool post is usually in the form of a clamp having an opening through which the wire or strip extends onto the mandrel, and which opening grips with substantial pressure the surface of the wire or strip as it is drawn through the clamp opening. The amount of pressure exerted by the clamp opening upon the surface of the wire or strip controls the set of the spring, which, with the external diameter of the mandrel about which the spring is coiled controls the internal diameter of the spring.

This practice of making springs, which has been followed from the earliest times, is tedious and expensive, requiring the manufacture of the metal into wire or strips, which is a relatively expensive form of metal, and then the turning of the springs in a lathe or similar tool, as above explained, which adds materially to the cost of the metal contained in the springs.

According to our invention, metal in the relatively cheap form of what is known as "bar stock" is mounted in a lathe, screw machine or similar tool, and rotated about its longitudinal axis, and the spring of the desired dimensions is sheared progressively from the end of such bar stock while the same is being rotated in such machine. The bar stock may be formed of cast, drawn or extruded metal. When such bar stock is formed on the one hand of cast metal or on the other hand of drawn or extruded metal, the characteristics of the spring helically turned from the end thereof is correspondingly different. Such difference resides not only in the inherent characteristics of the cast metal on the one hand and the worked metal on the other, and such separate characteristics are each improved for spring purposes by the character of the tool employed to helically cut the spring from the end of the bar stock, due to the working of the metal by such tool. We have found that a thin tool, that is, a tool in which the metal below its cutting edge is relatively thin, will cold work the metal of the spring to some extent while the same is being severed by such tool from the end of the bar stock. While such cold working may afford some slight change in the characteristics of the metal of the spring as severed from the end of the bar stock, we have found that such characteristics are of little benefit for spring purposes, and that substantial cold working of such metal while being cut transforms its characteristics into those very advantageous for spring purposes. Pursuant to such finding, we have discovered that such substantial cold working may be accomplished while and by cutting metal with a cutter of abnormal top and side rakes, either or both of which substantially increase the force required to cleave the metal spring from a larger piece of metal, and that such increased force may be afforded by employing a cutting tool of normal top and side rakes but having one or more relatively shallow nicks in its cutting edge with a corresponding groove extending from such nick, or nicks, across at least a part of the side rake or beveled surface of the cutter, that the cold working characteristics of the spring helically cut by such cutter from the end of bar stock will greatly improve the metal of such spring and increase its useful life and effectiveness for spring purposes. Each of these nicks and associated grooves respectively in the cutting edge or top rake and across the beveled surface or side rake of the cutter cause a corrugation to be formed in the thus severed spring. Any number of these corrugations may be employed in the width of the spring, and each corrugation adds to the strength, resiliency and freedom from breakage or fracture of the spring, and enables a spring of a given strength to be produced from much thinner metal of lesser weight and cost than has heretofore been possible.

Likewise, a spring of greater strength may be produced from the thickness of metal heretofore employed for making springs according to prior practice.

We have also found that when a cutting or turning tool with abnormal top and side rakes, and any or all of the other means herein disclosed, is employed, very satisfactory springs of greater cold worked characteristics are cut or turned thereby from a cheaper form of metal than has been possible to use in making springs by the prior practice.

While the disclosure hereof more specifically relates to the production of the heretofore more expensive form of helically coiled spring, the same will be understood by those skilled in the art to also apply to the production of flat springs by providing the cutter normally adapted for such cutting with the cutting edge and its beveled surface with the features of our invention.

We have also found that by severing the spring helically from the end of the bar stock by a cutter having metal of substantial width supporting its cutting edge, so that the spring as thus severed from the end of the part is extended initially at a wide angle from the surface of the end of the bar, such severed spring is thereby substantially improved in its spring characteristics. This improvement is due to the resulting cold working of the metal occurring simultaneously with its severance from the end of the bar. In the severance of such spring, it may be observed that the end of the bar, from which a preceding portion of the helical spring has been cut, has a bright and glossy appearing surface, while the outer surface of the helix as the same is being severed from the bar and passed over the side rake or beveled surface of the thick portion of the cutter supporting the bar, the outer surface of such severed portion of the helix commencing opposite the point of severance from the bar, is transformed from such bright surface to a dull one, or the appearance of sand blasted glass, or has a frosted appearance. This transformation is due to the peculiar cold working of the metal as it is being severed. Such transformation appears to be due to a compression of the metal as it is severed to form the spring, and which compression seems to be localized upon that side of the severed spring which is not contacted by the cutter in its severance from the part, while the opposite surface of the severed spring in contact with the cutter in such severance, is also cold worked. This latter cold working seems to be a stretching of the severed metal together with its polishing contact with the beveled surface of and supporting the cutting edge of the cutter.

This different cold working of opposite surfaces of the severed spring we have found very advantageous and beneficial in springs as affording greater resiliency, strength, and freedom from breakage or fracture of the spring, which enables a spring of a given strength to be produced from much thinner metal of lesser weight and cost than has heretofore been possible. We have also found that when this last named cold working is afforded by a tool whose cutting edge is provided with the aforesaid nick or nicks, each having a corresponding groove extending over at least a portion of its beveled surface, that such beneficial characteristics are greatly improved, so that a much superior spring results or that an equal spring is made of far lighter metal and less cost.

Other features and advantages of the invention will appear in the specification.

In the drawing, in which like reference characters indicate the same part,

Fig. 1 is a side elevation view of a spring embodying our invention;

Fig. 2 is a top plan view thereof;

Fig. 3 is a cross-sectional view taken through one portion of such spring;

Figs. 4, 5 and 6 are views similar to Fig. 3, but disclosing different numbers of corrugations;

Figs. 7 and 8 are respectively end and side elevation views of a tool for turning the spring from the end of a bar;

Figs. 9 and 10 are respectively views similar to Figs. 7 and 8, but of a different such tool;

Fig. 11 is a side elevation view of the forward portion of a differently constructed tool, similar to Figs. 8 and 9.

Fig. 12 is a side elevation view, partly in central vertical section, of a bar from the end of which the spring may be turned by the tools shown in Figs. 7 and 8;

Fig. 13 is a side elevation view of a bar from the end of which a portion of the spring has been turned by the tool shown in Figs. 8 and 9 or the tool shown in Fig. 11;

Fig. 14 is a side elevation view of the end portion of a bar with the initial portion of the spring turned from the end thereof by a cutting tool whose cutting end is shown in cross-section; and Fig. 15 is a top plan view of, for instance, the tool of Figs. 7 and 8, beside which is a turning tool for truing up the exterior diameter of the bar stock in advance of the helical turning of the spring from the end thereof, and both of which tools are to be clamped in the tool post of the lathe or other machine-tool in which the bar stock is revolvably mounted.

A metal bar 10, Fig. 12, which may be cylindrical or of any desired exterior shape corresponding to the exterior shape of the desired spring, may be mounted in the chuck of a lathe, screw machine, or other turning machine-tool. Said bar has a longitudinal opening 11 extending centrally therethrough. The shank 12 of a turning tool, Figs. 7 and 8, is placed in the tool post of the before-mentioned machine-tool. The forward upper edge 13 of shank 12, which comprises its sharp cutting edge is formed at the top of the relatively broad forward portion 14 of such tool. The lateral clearance surface 15 of portion 14 extends downwardly from said edge 13 at a slight angle to avoid frictional contact with the end of the bar from which a portion of the spring has been severed, while the opposite lateral surface 16 of said portion 14 extends downwardly from said edge 13 at a wide angle, extending preferably to the lower edge of said portion 14.

In operation, the bar 10 is rotated by the machine-tool. The shank 12 of the turning tool is rigidly mounted in the tool post of such machine-tool with the point of said cutting edge 13 extending within the opening or bore 11 in bar 10. The above stated machine-tool and its tool post are not illustrated, as the same are well known, and any of the various forms of such machine-tools may be advantageously employed in which the tool post is adapted to move longitudinally toward and into the end of the bar 10 at a rate proportionate to the speed at which the bar 10 is rotated. The rate of such longitudinal movement of the tool post determines the thickness of the spring to be cut from the end of the bar, while the width of the spring so cut is determined by the thickness of the wall of the tubular bar 10. As the cutting edge 13 of turning tool shank 12 commences and continues to cut into the end of the metal bar 10, pursuant to the rotary motion imparted to bar 10 by said machine-tool and to the longitudinal relative motion of the tool post in which is mounted the turning tool shank 12, the helical spring 17 is helically cut from the end of bar 10 by said cutting edge 13. In such cutting, the surface 15 of portion 14 of turning tool shank 12 is, by its aforesaid slight angularity, out of frictional contact with the end of the metal bar from which the spring 17 is being turned. In the helical turning or cutting of the helical spring 17 from the end of the metal bar, the portion of the spring being severed from the bar is forced downwardly and outwardly in firm frictional contact with said surface 16 of portion 14 of turning tool shank 12, and in substantial frictional contact therewith. This turning is done at room temperature, but the force and friction required in such cutting of the spring 17 from the end of the bar results in substantial heat being imparted mainly to the portion of spring 17 being severed from the end of the metal bar. In such severance it is believed that the surface portion of the spring 17 being severed by the cutting edge 13 and passed downwardly over the angular surface 16 of portion 14 of the turning tool shank 12, is subjected to a stretching action, as well as to substantial frictional action in its passage over said surface 16. For instance, when the spring 17 is cut from the end of a copper bar, the surface 18 of the end of such bar from which a portion of the spring has been cut is very bright, as well as smooth, as is the surface of the cut spring which passes over the surface 16 of the portion 14 of tool shank 12. Substantially at the point 19, in Fig. 14, where the severed portion of the spring 17 commences to deflect from the surface 18 of the end of the bar from which the spring is being turned, the outer surface of the spring 17 is transformed into a dull finish or appearance, which simulates a frosted appearance, or that of a sand-blasted surface. Since every part of spring 17 must pass said point 19, the whole of said surface of the thus severed spring has a uniform dull or frosted finish or appearance. This dull or frosted appearance is believed to be due to the metal comprising said surface of the spring 17 being subjected by such progressive severance to substantial compression, which is successively and uniformly imparted to the spring as it is severed from the bar of metal. This severance of the spring from the bar simultaneously affords to the opposite surfaces of the spring 17 a cold working which is different in kind upon each of said surfaces, since the physical appearance of said severed surfaces is substantially different. We have found that said cold working of opposite surfaces of the spring 17 is very beneficial and that it increases the strength, efficiency, durability, and freedom from breakage of the spring of a given weight of metal, or produces a spring of equal strength, efficiency, durability, and freedom from breakage of the spring when made from thinner and, consequently, lighter metal, with resulting decrease in cost per spring, due to the saving of weight, apart from the further substantial saving in the production cost of the spring afforded by our invention.

The opening or bore 11 extending longitudinally through the bar 10 may normally control the size of the opening 20 through the center of the spring 17, shown in Figs. 1 and 2. However, by manipulation of the cutting edge 13 of the turning tool shank 12, the size of said opening 20 in spring 17 may be larger or smaller than the opening or bore 11 in bar 10. Such manipulation comprises a setting in the tool post of the shank 12 of the turning tool such that its cutting edge 13 extends toward its point or outer end at a slightly downward angle. The size of the opening 20 through spring 17 may thus be made less in diameter than the opening or bore 11 in bar 10; while, when the cutting edge 13 is adjusted in the tool post to extend at a slightly upward angle toward its point or outer end, the diameter of the opening 20 through spring 17 is made somewhat smaller than that of the opening or bore 11 in bar 10. This variation in the diameter of the opening 20 is due to the stated angularity of the cutting edge 13 exerting an inward or outward thrust progressively upon the spring 17 as it is being severed from the end of the bar of metal.

The before-stated cold working characteristics of the spring are imparted simultaneously with its cutting from the end of a bar of copper, and similar cold working characteristics likewise appear when the metal bar is of metal other than copper.

The dimensions of the spring in the width and thickness of each helix are matters which may vary as to the thickness of each helix, according to the rate of longitudinal movement of the tool post to the turning speed of the metal bar; while the width of each helix is determined by the thickness of the bar 10 from its opening or bore 11 to its circumference.

The spring heretofore described is of any shape which the before-stated conditions may produce.

The corrugation, or corrugations, in the spring substantially shown in Figs. 1–6, inclusive, and the manner of making the same will now be described.

In the sharp cutting edge 13 of portion 14 of tool shank 12, Figs. 7 through 11, is formed one or more nicks 21 from which extends across at least a portion of the surface 16 of portion 14 a depressed groove 22. In Figs. 7 through 10 said groove 22 extends completely across said surface 16, while in Fig. 11 said grooves 22 extend only partially across said surface 16, by reason of the fact that the bottoms of the grooves 22 are at a wider angle than said surface 16, which results in said grooves 22 fading out as it were after they traverse only a portion of the width of the surface 16 from said edge 13. The helices of the spring 17 may have any number of corrugations 23 therein extending helically along the juxtaposed surfaces of the helical spring, and which corrugations 23 are formed each by a corresponding nick 21 and grooves 22, respectively, in the edge 13 and surface 16 of portion 14 of the turning tool shank 12, and which corrugations 23 are formed in said spring 17 simultaneously with the spring being turned or cut from the end of the metal bar. The formation of said corrugations 23, each comprising a convex ridge 24, which substantially conforms to the shape of nick 21 and groove 22 aforesaid, extending from and helically along one surface of each helices of spring 17, and upon the opposite surface of each helices of spring 17 is a concave valley 25 registering with said ridge 24. Any number of corrugations 23 may be formed in the spring according to the number of nicks 21 and grooves 22 in the turning tool. Each of said corrugations 23 in said spring materially increases the strength, efficiency, durability and freedom from breakage of the spring, or produces a spring of equal strength, efficiency, durability and freedom from breakage when made from thinner and, consequently, lighter material, with resulting decrease in cost per spring, due to the saving of weight, apart from the further substantial saving in the production cost of the spring afforded by our invention.

For instance, in a spring of relatively short length having one corrugation therein, substantially as shown in Figs. 1, 2 and 3, the same was fully compressed some 10,000 times without apparent diminishment of the length and strength of the spring.

In the helical turning of the spring from the end of the bar 10 the rotary motion of the severed portion of the spring, with the bar 10, by the lathe or other turning tool, causes the severed portion of the spring 17 to be whipped about. This is liable to break the spring or to do injury to persons or property. To avoid this liability a rod 26 is extended longitudinally of the bar 10 into its opening or bore 11. This rod 26 is adapted to be carried or supported by the aforesaid tool post or any other portion of the machine-tool, and is adapted to receive and support the severed portion of the spring, by such severed portion of the spring surrounding such rod 26 and by maintaining the same in alignment with the bar 10 from which the spring is being severed.

In Fig. 13 is illustrated a solid bar of metal 10a having no opening or bore therethrough, with a portion of the spring 17 helically turned therefrom and supported by a central integral round bar of metal 10b projecting longitudinally from the center of the end of bar 10a from which the portion of spring 17 has been severed, said bar 10b supporting the severed portion of the spring 17 by loosely engaging in the central opening 20 of spring 17. Said bar 10b is simultaneously formed by the helical cutting or turning of the spring 17 from an end of the solid bar 10a with a single tool, as shown in Figs. 9 and 10, or that shown in Fig. 11, and without the formation of a shaving or cutting other than the severed portion of the spring 17 or the said bar 10b, so that no waste of metal may occur in the helical turning of a spring of our invention from the end of a solid bar of metal 10a.

In the turning of the helical spring from the end of tubular bar 10, Fig. 12, the outer end or point of the cutting edge 13 performs no cutting at its point, because such point extends into the opening or bore 11 in the center of the said bar 10. However, in turning the spring 17 from the solid bar 10a, Fig. 13, with a single cutter and without a shaving other than the spring 17, the outer or point end of the cutting tool is substantially constructed, in accordance with our invention, by providing, Fig. 11, commencing at the outer end of the cutting edge 13, a cutting edge 13a, which at its top merges into the cutting edge 13, and extends downwardly therefrom along the outer or forward margin of the surface 16 of portion 14. The outer terminus of portion 14 of the turning tool shank 12 comprises a surface 14a, one of whose margins is the cutting edge 13a, another of which margins is the outer edge of the lateral surface 15 of portion 14, which said surfaces 15 and 16 apex at the cutting edge 13, while the remaining edge of said surface 14a is the bottom of portion 14 of the turning tool, said surface 14a extending at a slight angle from the cutting edge 13a downwardly toward the shank 12 of the turning tool, the lowest point of such inclination being at the lower edge of portion 14 at the point therein which is joined by the lower terminus of said surface 15. In helically turning the shaving from the end of the solid bar 10a with the tool of Fig. 11, the procedure heretofore described relative to Figs. 7, 8, and 12, may be followed, except that the point of the turning tool of Fig. 11, comprising the juncture of the cutting edges 13, 13a, is set at the outer diameter of the bar 10b, Fig. 13. In such setting the longitudinal cutting edge 13 of said turning tool progressively severs the lateral surfaces of the helical spring 17 from the end of bar 10a, while the downwardly and outwardly inclined cutting edge 13a simultaneously progressively forms said bar 10b and the opening 20, Fig. 2, of spring 17, by progressively cutting the inner edge of spring helices 17 from the bar 10a, at the same time forming the turned bar 10b at the end of bar 10a, and which bar 10b also supports the severed portion of the helical spring 17 from being whipped about by the rapid rotation of bar 10a during the cutting of such spring, and thereby precludes the breakage of the severed portion of the spring, as well as injury to persons and property therefrom.

As shown in Figs. 9 and 10, the tool of Fig. 11 may be provided with a portion of a nick 21a, similar to one of the nicks 21, in the point of the cutting edge 13 and a portion of a groove 22a, which, if complete, would be substantially like one of the grooves 22, extending along the outer end of the surface 16 of portion 14, with the bottom of said groove portion 22a comprising the cutting edge 13. This produces at the margin of the central opening 20 through spring 17 a portion 23a of a corrugation, which, if complete, may be substantially like the corrugation 23. We have found that such corrugation 23a affords additional benefit and advantage to the spring 17 in increased strength, efficiency and freedom from breakage, as well as in finish or appearance by additionally cold working the inner edge of the spring helices simultaneously with its severance from the bar.

It will be understood that the spring 17 may be employed as a compression or an extension spring with equal advantage, in either of which employments the aforesaid surfaces of the spring in helical alignment with the force exerted upon such spring will be differently cold worked, as heretofore described. It is also apparent that said spring may also be advantageously employed as a torsional spring.

It will furthermore be understood by those skilled in the art that with no more skill, time or expense, but with little more power than required for making a waste shaving of substantially the same cross-sectional area, our invention produces very rapidly and cheaply a most efficient spring, having wide utility, great durability and economy.

The cutting edge 13, with or without the one or more nicks 21 therein and associated grooves 22, in the cutting of metal exerts considerable compression stress upon the metal of the bar immediately in advance of the actual progressive severance of the helical spring from the end thereof. This compression is localized progressively in the relatively small region in the end of the bar 10 or 10a, immediately in advance and upon opposite sides of the cutting edge 13 of portion 14 of the turning tool shank 12. We have found in the turning of helical springs that such compression is produced or substantially contributed to by the wide angle of the beveled or side rake surface 16 extending from such cutting edge 13. Such compression, we have found, increases the density of metal comprising the severed portion of the helical spring, as well as in the metal comprising the surface of the bar from which the severed portion of the spring was severed. We have also found that the one or more nicks 21 and associated grooves 22 in and associated with the cutting edge 21 substantially increases said compression and resulting density in the region of the line of cleavage of metal being cut to form the spring. These are substantial steps in cold working which we have found so beneficial and advantageous in the production of springs. Immediately progressively following said compression working of the metal occurs the beforementioned further cold working of the metal, comprising the stretching and the burnishing of the metal of the surface of the spring as it is sharply deflected from the bar by sliding over the surface 16 of portion 14 of the shank 12 of the turning or cutting tool; while at the same time the metal of the opposite surface of spring 17 as it is cut from the end of the bar is compressed, increased in density and transformed from a bright to a frosted appearance. The metal adjacent the surface of the grooves or valleys 25, one or more of which may be in the spring 17, is cold worked to a greater degree in and incident to the action thereon of the nick or nicks 21 and accompanying groove or grooves 22 associated with said cutting edge 13, and said metal has a more pronounced frosted appearance. This additional cold working is due to the stress of arching the metal into the groove. This stress is at right angles to the before-stated arching at point 19 of Fig. 14 of the metal of the surface of the spring 17 which is out of contact with side surface or rake 16 of tool 12. The arching of the metal of the severed spring at said point 19 as well as to form the groove 25 in spring 17 each cold works the metal of the spring 17. The surface of severed spring 17, which contacts with the side rake or surface 16 of tool 12, by its arching or deflection from bar 10 or 10a, is further cold worked by being slightly stretched as well as burnished and rendered bright by its forceful contact with and sliding over said surface 16.

The cutting or turning of the spring occurs at atmospheric temperature with no more heat than is generated by the cutting or turning operation.

While the cutting or turning tool shown has afforded excellent results in the making of the spring from copper, it will be appreciated that similar results may be obtained with other metals and alloys by substantially the same tool with such changes therein as long practice has taught those skilled in the art to make in such tools when employed to cut different metals and alloys.

We have further found that the cold working of the metal to an extent above the elastic limit of such metal, and which results in a permanent transformation of its characteristics, is the kind of cold working which affords the improved advantages and benefits of the metal which we have found advantageous for spring purposes, although the same may be contributed to in some degree by working or cold working the metal below such limit as may be incident to the before-stated working of the metal simultaneously with its cutting.

It may be understood from the foregoing, by those skilled in the art, that the above described cold working of the metal simultaneously with and by the manner of its cutting or turning produces a temporary stressing of the metal beyond its elastic limit and not beyond its point of fracture, which substantially increases the strength and toughness of the metal at and adjacent the line of its cleavage. Before our invention it was known that solely by cutting or turning a shaving from a piece of metal, or cutting or turning such metal article, such shaving or article possessed greater strength, toughness, surface density and resistance to corrosion than was possessed by the parent metal from which the shaving or the article was cut or turned. We were the first in the art to solve the heretofore long and vainly sought problem of inexpensively making a satisfactory spring of metal, which, in the state employed by us, was normally unadapted for satisfactory or useful spring service. In our solution of said problem we employ such unadapted and cheaper form of metal, and simply, expeditiously and inexpensively transform such metal of the constructed spring into those characteristics which we have found useful and advantageous for spring purposes. As a part of such solution, we have been first to make springs by a process of cutting or turning the spring from a larger piece of metal. In such cutting or turning, we transform the metal of the spring by stressing the metal beyond its elastic limit and below its fracture point. Under such stress a flowage of the metal occurs although the metal may be under atmospheric temperature except for such stress. Such flowage cold works the metal of the spring and transforms the same into characteristics which we have found very economical and advantageous for spring purposes. Specifically, we subject the metal to such stress as a part of our process of making the spring. Such process is by abnormally cutting or turning the spring from a larger piece of metal. The abnormalcy in such cutting or turning appears to reside in the fact that heretofore springs have not been so made, and further, that greater reluctance is designedly occasioned to the passage of the cut or turned metal over and past the cutting or turning tool, and consequently the metal cut or turned is subjected to greater than normal stress at and adjacent the line of cleavage of the metal. Such greater reluctance and stress occasions the before-stated flowage and cold working of the metal at and adjacent the line of cleavage of the metal of the spring from a larger or thicker piece of metal. We were first to so cold work the metal by and simultaneously with the cutting or turning of the same, by our process and tool, from a larger piece of metal whose normal characteristics are unadapted for spring purposes, but which our said cold working transforms into characteristics which we have found useful and advantageous for springs required in normal, as well as for some springs in severe service conditions. Such transformation by cold working the metal occurs in the shaving or portion cut or turned by our process and tool from the parent metal, as well as in the surface of the parent metal from which the shaving or portion was cut or turned.

We are aware of a practice, termed Auto Frettage, of cold working metal by directly applied hydraulic liquid pressure, which stresses the metal manufactured into ordnance bores beyond its elastic limit and below its fracture point, to increase its strength, but our invention is radically different therefrom and a substantial improvement thereon.

This is a divisional application of our copending application Serial No. 178,698 filed December 8, 1937.

The invention herein described may be manufactured and/or used by or for the Government of the United States of America for governmental purposes without the payment of any royalties thereon or therefor.

We claim:

1. A cut spring comprising an integral metallic member, the entire lateral surfaces of said member being formed by a cutting operation and cold worked by the cutting.

2. A cut spring comprising an integral metallic member having at least one corrugation extending longitudinally thereof, the entire lateral surfaces of said member being formed by a cutting operation and cold worked by the cutting.

3. A cut spring comprising an integral metallic helical member, the entire lateral surfaces of said member being formed by a cutting operation and cold worked by the cutting.

4. A cut spring comprising an integral metallic helical member having at least one corrugation extending longitudinally thereof, the entire lateral surfaces of said member being formed by a cutting operation and cold worked by the cutting.

5. A cut spring comprising an integral metallic member having at least one registering projection and depression extending longitudinally along opposite surfaces thereof, the entire lateral surfaces of said member being formed by a cutting operation and cold worked by the cutting.

ALFRED J. BERG.
JOHN O. HUSE.